(12) United States Patent
Rumph

(10) Patent No.: US 7,113,517 B2
(45) Date of Patent: *Sep. 26, 2006

(54) CONFIGURABLE HARDWARE SCHEDULER CALENDAR SEARCH ALGORITHM

(75) Inventor: Darryl Jonathan Rumph, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

This patent is subject to a terminal disclaimer.

(21) Appl. No.: 09/966,304

(22) Filed: Sep. 27, 2001

(65) Prior Publication Data

US 2003/0058877 A1 Mar. 27, 2003

(51) Int. Cl.
*H04L 12/56* (2006.01)
*G06F 12/00* (2006.01)

(52) U.S. Cl. .................... 370/412; 370/395.4; 711/216
(58) Field of Classification Search ...................... None
See application file for complete search history.

(56) References Cited

U.S. PATENT DOCUMENTS

| | | | | |
|---|---|---|---|---|
| 5,379,428 A | 1/1995 | Belo | | 395/650 |
| 5,533,020 A * | 7/1996 | Byrn et al. | | 370/395.4 |
| 5,671,406 A * | 9/1997 | Lubbers et al. | | 707/7 |
| 5,920,724 A | 7/1999 | Chang | | 395/709 |
| 5,978,797 A | 11/1999 | Yianilos | | 707/3 |
| 6,028,843 A * | 2/2000 | Delp et al. | | 370/235 |
| 6,044,222 A | 3/2000 | Simons et al. | | 395/709 |
| 6,049,526 A | 4/2000 | Radhakrishnan et al. | | 370/229 |
| 6,061,709 A | 5/2000 | Bronte | | 709/103 |
| 6,118,901 A | 9/2000 | Chen et al. | | 382/236 |
| 6,161,173 A | 12/2000 | Krishna et al. | | 712/214 |
| 6,167,400 A | 12/2000 | Brandin | | 707/6 |
| 6,175,814 B1 | 1/2001 | Chrysos et al. | | 702/182 |
| 6,202,063 B1 | 3/2001 | Benedikt et al. | | 707/3 |
| 6,370,144 B1 * | 4/2002 | Chao et al. | | 370/395.42 |
| 6,643,257 B1 * | 11/2003 | Likovich et al. | | 370/229 |
| 6,675,171 B1 * | 1/2004 | Tikkanen et al. | | 707/101 |
| 2002/0163935 A1 * | 11/2002 | Paatela et al. | | 370/466 |
| 2005/0018682 A1 * | 1/2005 | Ferguson et al. | | 370/392 |

FOREIGN PATENT DOCUMENTS

JP 6068202 3/1994

* cited by examiner

*Primary Examiner*—Steven Nguyen
(74) *Attorney, Agent, or Firm*—Joscelyn G. Cockburn

(57) ABSTRACT

Apparatus and method that schedules movement of packets within network devices, such as network processors, includes a calendar using a sectored hierarchical routine to identify the next packet to be moved from one of a plurality of flow queues. The segmented hierarchical routine allows searching to begin from any starting point identified by a current pointer CP in each segment.

1 Claim, 12 Drawing Sheets cp = search starting point
n = number of equal segments
r = log₂(num_entries)
m = total number of entries/number of equal segments
p = log₂(total number of entries/n)

Diagram for Segment Search
Assuming That cp is In This Segment

Diagram for Segment Search Assuming
That cp is Not In This Segment

Segment Search Diagram Assuming
cp is In This Segment

Segment Search Outputs

CONFIGURABLE HARDWARE SCHEDULER CALENDAR SEARCH ALGORITHM

CROSS-REFERENCE TO RELATED PATENT APPLICATIONS

The present application relates to the following documents, assigned to the assignee of the present invention, incorporated herein by reference:

Patent application Ser. No. 09/834,141, filed Apr. 12, 2001 (priority date Apr. 13, 2000) by Brian M. Bass et al., entitled "Method and System for Network Processor Scheduling Based on Service Levels".

Patent application Ser. No. 09/546,651, filed Apr. 10, 2000, by Peter I. A. Barri et al., entitled "Method and System for Managing Congestion in a Network". This patent is sometimes referred to herein as the Flow Control Patent.

Patent application Ser. No. 09/547,280, filed Apr. 11, 2000, by Marco Heddes et al., entitled "Unified method and System for Scheduling and Discarding Packets in Computer Networks". This patent is sometimes referred to herein as the Packet Discard Patent.

Patent application Ser. No. 09/384,691, filed Aug. 27, 1999, by Brian Bass et al., entitled "Network Processor Processing Complex and Methods". This patent is sometimes referred to herein as the Network Processing Unit Patent or NPU Patent.

U.S. Pat. No. 6,222,380 entitled "High Speed Parallel/Serial Link for Data Communications" issued Apr. 24, 2001. This patent is sometimes referred to herein as the Link Patent.

BACKGROUND OF THE INVENTION

1. Field of the Invention

The present invention relates to communication network apparatus such as is used to link together information handling systems or computers of various types and capabilities and to components and methods for data processing in such an apparatus. More particular the present invention relates to calendars used in such devices to indicate when the next packet is to be transmitted from queues within the devices.

2. Description of the Prior Art

Scheduling the transmission of packets between points within a communications device or between points in the communications device and an external transmission network is well known in the prior art. The conventional approach is to provide a plurality of queues within the device and packets to be transmitted are enqueued to selected queues. A timing device sometimes called a timing wheel or calendar is searched to determine when the next packet is to be dequeued and forwarded from the queues. The selection, queueing and dequeueing of packets are controlled by several factors collectively referred to as Quality of Service (QoS). Because the factors and QoS requirements are well known in the prior art further discussion is not warranted. Suffice it to say U.S. Pat. Nos. 5,533,020 and 6,028,843 are examples of prior art.

Even though the prior art devices work well for their intended purposes and in the case of U.S. Pat. Nos. 5,533,020 and 6,028,843 the technology has been advanced beyond what it was at the time when these patents were invented, the communications technology is faced with new problems requiring new techniques and solutions.

One of the problems is that the volume of data has increased due to the increase in the number of users. There are also demands to improve QoS. To address these problems it is desirable to use a hardware scheduler to schedule the transmission of packets from queues in the network devices. It is common knowledge that the hardware implementation of a device is usually faster than its corresponding software implementation.

Notwithstanding, the hardware implementation of a scheduler presents certain problems which have to be addressed if the scheduler is to be used in an environment in which QoS and package throughput are relatively high. Among the problems to overcome are:

a) a physical limitation as to how much "searching" can be done in one of the system clock cycles, as each circuit consumes a finite amount of time against the clock period.

b) a finite number of clock cycles that the search must be completed by, as the winning calendar location must be used by the Scheduler circuits downstream as a part of the overall Scheduler function. So, reducing the number of clock cycles it takes to find a winner is very important.

c) a need to change the number of entries for the search to meet customer demands, as new generations of Hardware Scheduler or related functions emerge.

d) changing system clock frequencies.

e) changing hardware technologies.

The scheduler and in particular the calendar described below overcomes these problems and can be easily redesigned to meet new requirements due to change in technology, increase in the amount of packets to be handled, etc.

SUMMARY OF THE INVENTION

The scheduler includes a plurality of functions working in a cooperative manner to transmit packets in accordance with predetermined QOS requirements.

One of the functions in the scheduler is the calendar which identifies the next packet to be transferred from one of the queues to which it had been enqueued. The present invention provides a scalable calendar which can be changed to provide a lower-cost higher performance solution than was heretofore been possible.

The calendar according to the teachings of the present invention overcomes the problems set forth above.

The calendar includes a search region, preferable in a memory, containing multiple consecutive locations. Each location includes a status bit or indicator bit and space to store information. The indicator bit can be set in one state when data is stored in the space and another state when there is no data. The search, region is partitioned into multiple segments. Each segment, containing a portion of the locations of the search region, is searched from a Search Starting Point (CP) by a Segment Search engine in accordance with predetermined algorithms and certain assumptions regarding CP.

Each of the segment search engines generates information identifying the first position from the CP having the indicator bit set to a logical '1' (called Interim Winner Valid) and the winning location. The information is stored for use by the Top Search Engine.

Another search engine termed Top Search Engine processes the information from the segment search engines to determine whether or not there is a Final Winner Valid and its location. Another function in the scheduler uses the Final Winner Valid indicator and the Queue identification (ID) at the location to move the next packet from the queue with like Queue ID.

The Search Starting Point (CP) for each segment is the same. The number of is bits required for CP for each segment is such that the number of inputs into the segment can be represented. For example, if a segment has 256 inputs (each input represents a position in the search region) the number of bits that CP has is $\log_2 256 = 8$. The maximum value of CP for the segment would be 255.

The assumptions for each segment are the same and are as follows:
  a) CP is not in the segment. For this assumption the search for the interim valid CP is from the current CP position (calculated above) to the top (last) location in the segment.
  b) CP is in the segment. For this assumption two searches are performed.
    i) One search is from the CP to the top of the segment.
    ii) The other search is from the bottom of the segment to the position preceding the CP position in i).

It should be noted the CP is identified by a pointer which is stepped by another function associated with the scheduler.

The Top Search Engine processes the segment information by (a) executing an algorithm which identifies the segment containing the CP. The algorithm is the high order bit of the digital representation of the number of segments. Using the example where there are 512 calendar locations, broken into eight 64-location segments, a top search winning value of binary "010" indicates that the segment search output for segment "010" must be use to determine the final winning location. If the winning location for segment "010" was a value of binary "111011", then the winning location would be represented in 9-bit binary as "010111011", corresponding to 221 decimal. As is evident from the example the final winning location is the identification (ID) for the segment containing the winner concatenated to the value for the winning location within the segment containing the winner.

By searching the calendar in accordance with the teachings of the present invention a dynamic calendar and scheduler is provided. The calendar and its associated scheduler are dynamic in that they can easily be redesigned to accommodate changes in the technology, size of the search region, changes in system clock frequencies, etc.

DETAILED DESCRIPTION OF THE PREFERRED EMBODIMENT

The invention described hereinafter may be used in any environment, particularly in computers, where an item of information is to be transferred at some time in the future from point A to point B. It works well in communications devices such as an interface device, also called Network Processor, and as such is described in that environment. However, this should not be a limitation on the scope of the invention since it is well within the skill of one skilled in the art to make changes or modification to adapt the invention to several other technologies. Any such changes or modification is intended to be covered by the claims set forth herein.

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
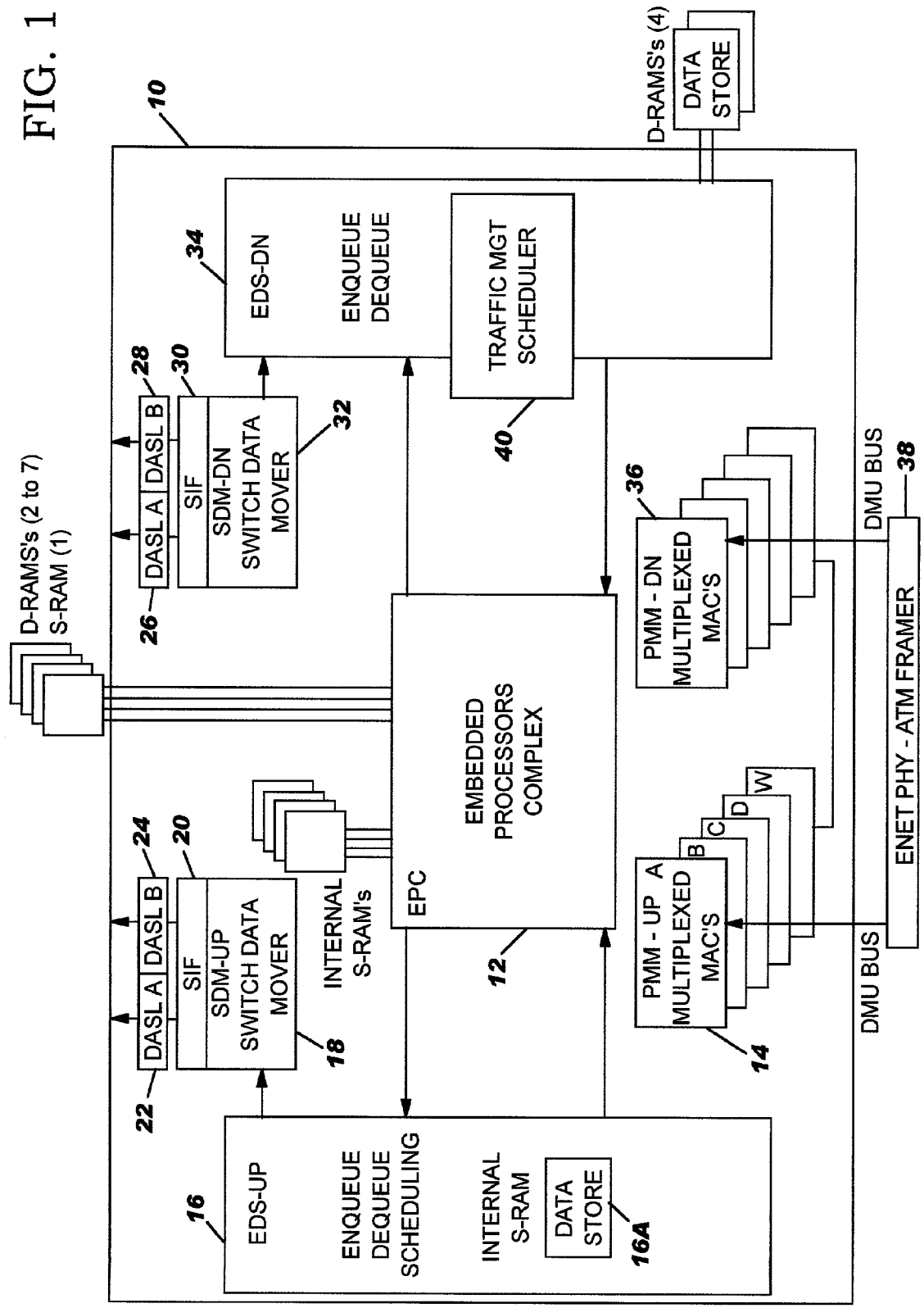
FIG. 1 is a block diagram of an interface device or Network Processor (NP) showing Embedded Processor Complex, DN Enqueue/Dequeue System and Traffic Management (MGT) Scheduler useful in practicing the present invention.

FIG. 1 shows a block diagram of the interface device chip that includes the substrate 10 and a plurality of subassemblies integrated on the substrate. The subassemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). The invention described hereinafter is in the egress portion of the chip. Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, System Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, system interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler containing the teachings of the present invention) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors in the EPC. After the input units or frames are processed by one of the plurality of processors in the embedded processor complex, the completed information units are scheduled through the scheduler 40 out of the processing unit 10 and onto the data transmission network through the PMM-DN multiplexed MAC's 36 and the physical layer 38. It is the scheduling of data that the present invention will describe hereinafter.

Figure 2:
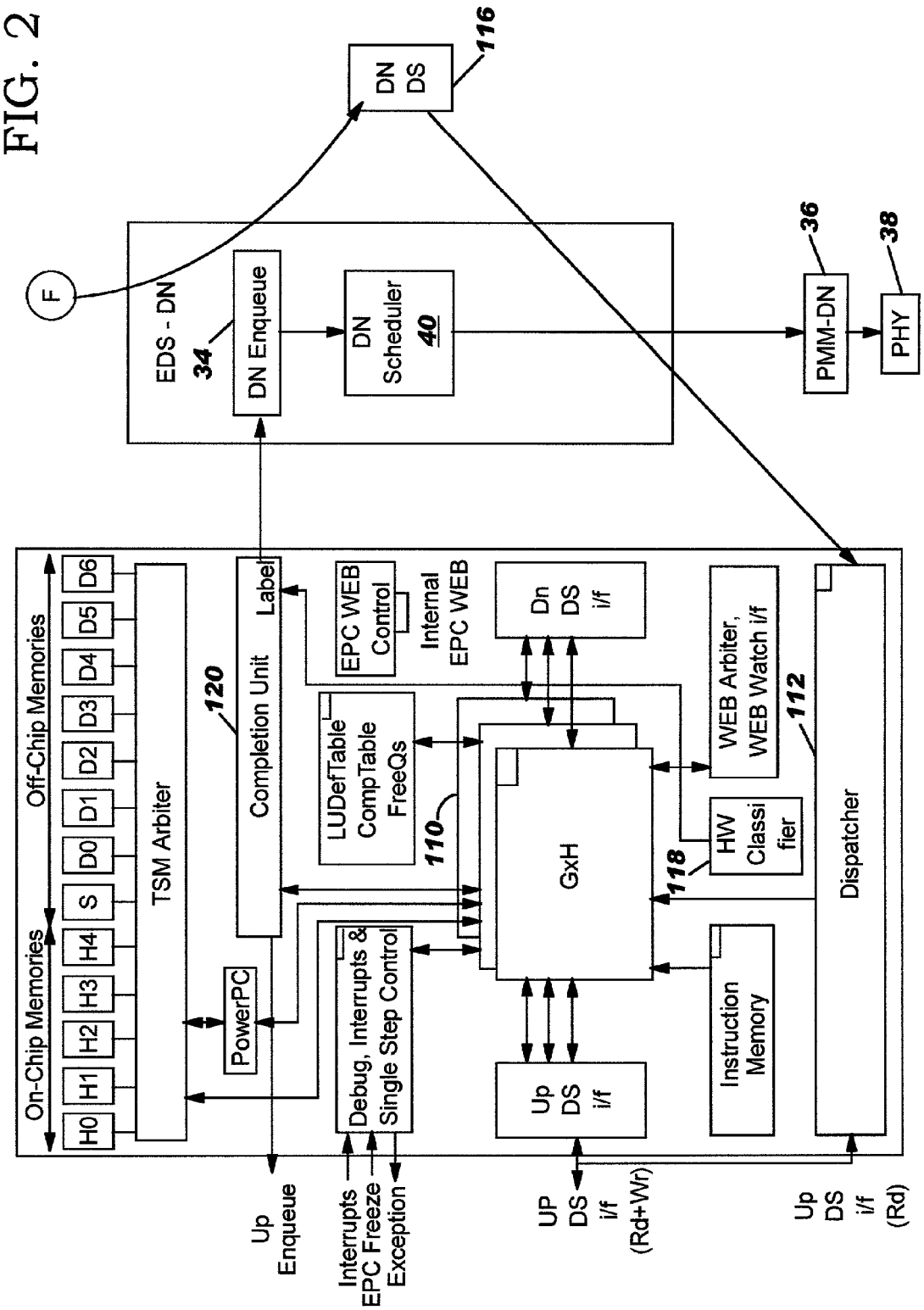
FIG. 2 is a block diagram of the embedded processor complex, DN Enqueue and DN Scheduler.

FIG. 2 is a block diagram of a processing system 100 which can employ the present invention to advantage. In this FIG. 2, a plurality of processing units 110 are located between a dispatcher unit 112 and a completion unit 120. Each incoming frame F (from a switch, not shown, attached to the present data processing system) is received and stored into an DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent.

Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled to the Dn Scheduler which is coupled through the PMM DN MAC's 36, then by the DMU data bus to the physical layer 38 (the data transmission network itself).

Figure 3:
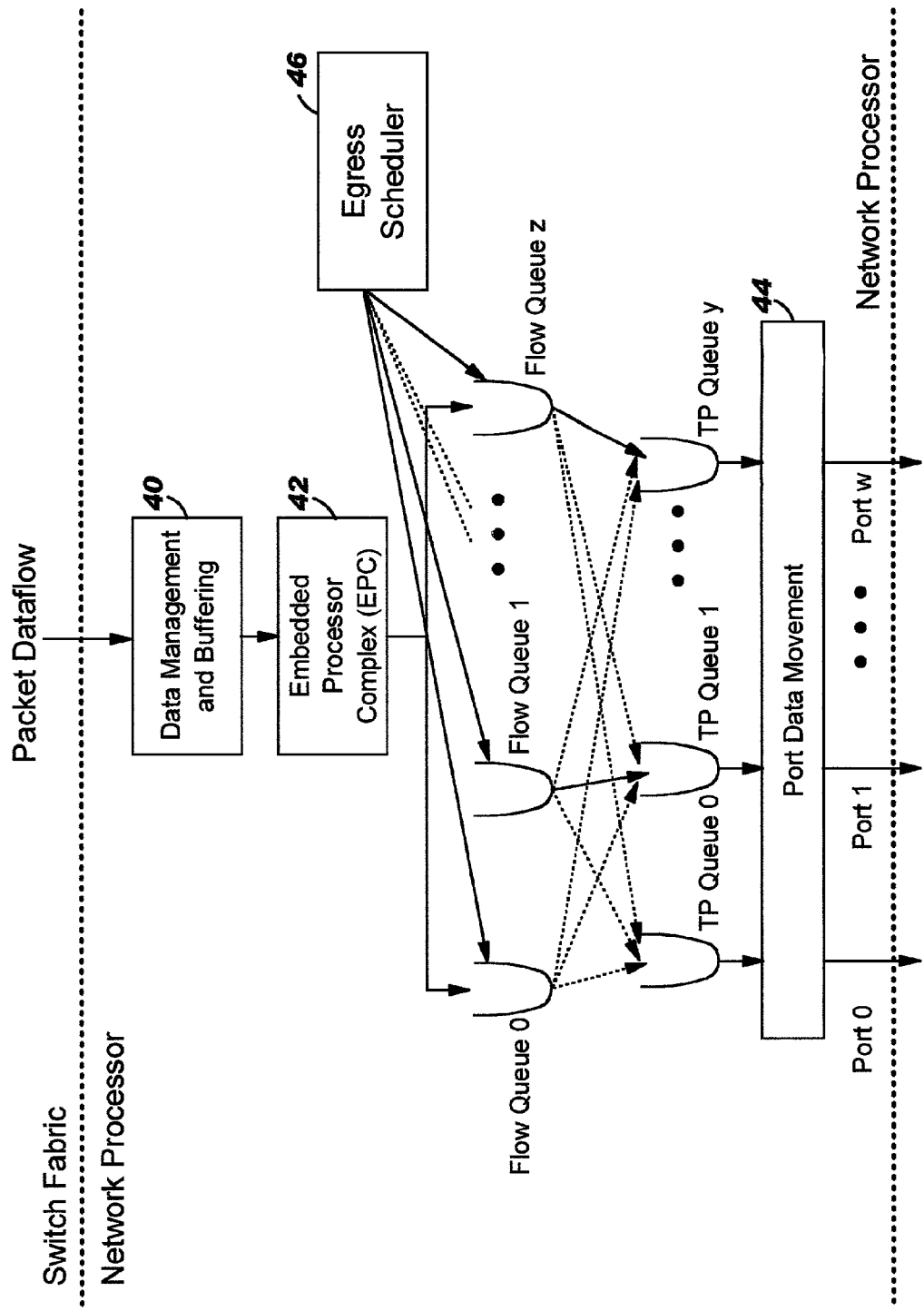
FIG. 3 is a block diagram of components required to understand the invention and are provided on the egress side of the interface device.

FIG. 3 shows a block diagram of the data flow on the Egress side of the Network Processor. It should be noted that Network Processor (NP) and Interface Device are used interchangeably. To make the figure less complicated only components which are necessary to understand the invention are shown. The components include Data Management and Buffering 40, Embedded Processor Complex 42, Flow Queues 0–Z, target port (TP) queues 0–Y, Port Data Movement 44 and Egress Scheduler 46. Each egress packet enters the Network Processor from a switched fabric against a "connection", that is, a definition of a path from the switched fabric to a specific output port. Prior to sending of any packet data this path is defined. Included in this path is the addressing information that is a part of the packet "header". This header is part of a table definition in the EPC that allows the EPC to determine the destination flow queue to which the data is enqueued. Each flow queue has a Queue Control Block (QCB) contained in the scheduler function that defines the destination target port (TP) in that flow queue.

Still referring to FIG. 3, egress packets enter the Network Processor and are buffered (stored) by Data Management and Buffering 40 which is responsible for managing the pointer to the packet data. These pointers will be passed to each functional block that will process the packet ending with the step where the packet data exits the Network Processor through the output ports. The Egress Scheduler 46 monitors the flow queue, and as packets are placed in a selected queue, the Egress Scheduler initiates movements of those packets in accordance with the invention to be described hereinafter and other Quality of Service (QoS) requirements to the appropriate target port from which the port data movement 44 packages the data in accordance with predetermined transmission protocol such as ethernet, etc., and forwards the data through one of the ports O through port w.

Figure 4:
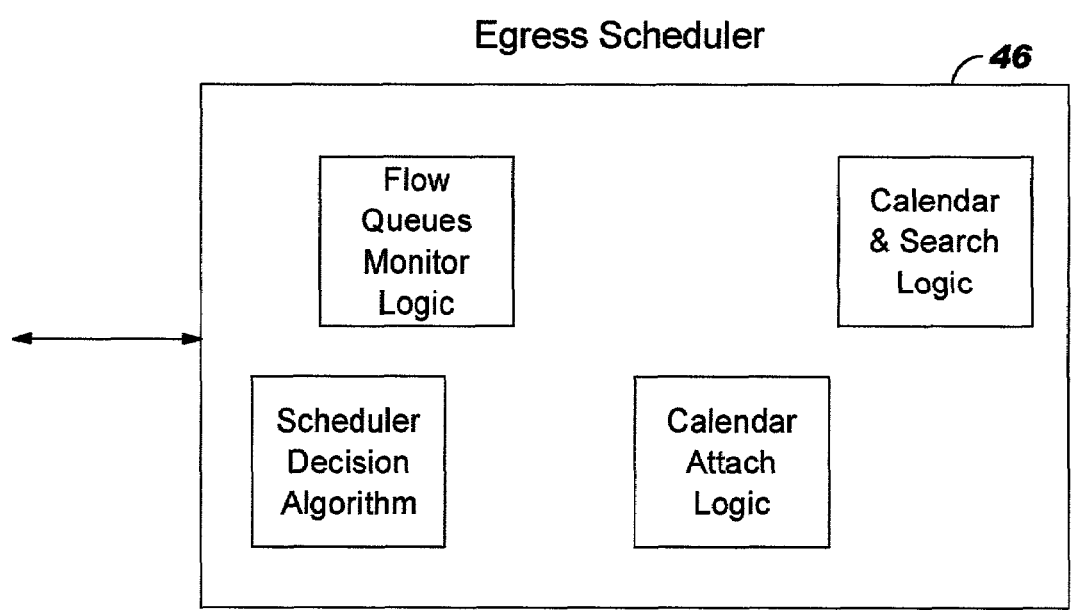
FIG. 4 is a logical representation of the Egress scheduler showing functional units according to the teachings of the present invention.

FIG. 4 shows a block diagram of Egress Scheduler 46? The function of Egress Scheduler 46 is to monitor the flow queues and at appropriate times determined by the invention herein move packets from flow queue to the target port (TP) Queue. To this end the Egress Scheduler 46 includes a plurality of functions which cooperate to provide the overall function of the scheduler. Included in the functions are the flow queue monitor logic which monitors flow queue to determine when a data packet is placed in a flow queue by the Embedded Processor Complex. The Egress Scheduler 46 also includes the calendar and search logic (to be described hereinafter), calendar attach logic etc.

It should be noted that even though the functions which are necessary for the Egress Scheduler 46 to carry out its function are shown in FIG. 4 as internal to the scheduler this is only a logical representation. In an actual Network Processor some of these functions may be located elsewhere in the Network Processor and not necessarily within the scheduler itself.

Still referring to FIGS. 3 and 4, the data packets enter the traffic flow queue 0–Z at a given queue id. Each of the queue ids has a level of service requirement, as specified via the QoS parameters. When a packet enters a queue, the Scheduler 46 determines when this packet may exit the same traffic queue id. This determination is performed by attaching the queue id to one of the locations of the calendar (details set forth herein) per the queue service requirements and using the network scheduler decision algorithm. There may be more than one packet in the traffic queue at any one time in that another packet may enter the same queue id before the scheduler determines that a packet may exit the queue. When there is one or more data packets in a traffic flow queue a queue will be attached to one of the many network scheduler calendars which indicates that the queue will be serviced at a later time. When a packet exits the queue, the scheduler will remove the queue id from the calendar location from which it was attached. If a packet exits the traffic queue and there is at least one additional packet in the queue, the scheduler will reattach this queue to another calendar location for service (packet exits from the queue) at a later time. If there are no more packets in the queue after packet exits, the scheduler will not reattach this queue to a calendar location. The scheduler continues to select traffic queues for service, one by one, until there are no more remaining packets in the traffic flow queues. During normal scheduler operation only one packet may enter a traffic flow queue during a "TICK" cycle. A "TICK" cycle is defined as a fixed number of system clock cycles in duration, and only one packet may enter and exit any of the traffic queues during a "TICK" cycle. Whenever one or more packets are in a traffic queue, this queue will be attached to one of the network scheduler calendars by the scheduler. This attachment indicates that a packet is due at some time in the future to exit the traffic queue. Only one packet may enter/exit one traffic queue at a time so there cannot be simultaneous packet entries into two or more queues nor can there be simultaneous packet exits from two or more queues.

In particular, FIG. 4 shows a diagram of the Network Scheduler operating as follows:

Data packets enter the traffic queue at a given queue ID. Each of the queue ID's have a level of service requirement. When a packet enters a queue, the network scheduler determines when this packet may exit the same traffic queue. There may be more than one packet in the traffic queue at any given time, in that another packet may enter the same queue before the first packet has exited the queue. The determination of when a packet may exit a flow queue is performed by (1) attaching the queue ID to one of the Calendars at a specific calendar location, as specified by the algorithm; and (2) considering this queue ID, along with other queue ID's that have been attached to the same or other calendar location for service via a calendar search. The search will determine which calendar location is the proper location that should be serviced next, if at all, and this calendar location is determined to be the "winning calendar location". The flow queue ID that has been attached to the winning calendar location will be serviced via moving a packet from this flow queue. At this time, the scheduler will detach this queue ID from the location where it was attached. If there is an additional packet in the queue after the packet has exited, the scheduler will reattach this queue ID to another calendar location per the algorithm. If there are no more packets in the queue after the first packet has exited, the queue will not reattach this queue to a calendar. The scheduler continues to select traffic queues for service in this fashion, one-by-one, until there are no more remaining packets in any of the traffic queues.

Figure 5:
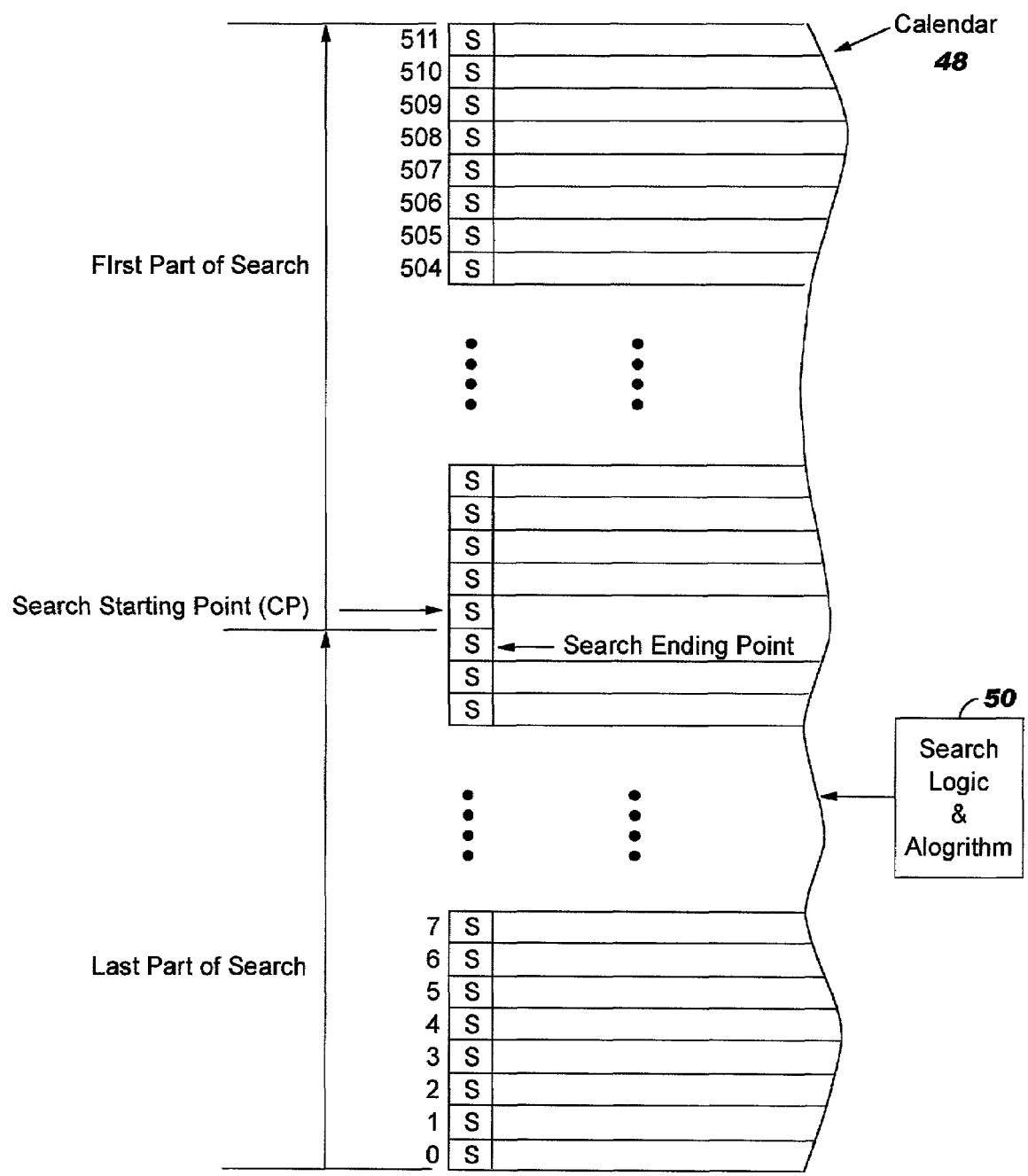
FIG. 5 shows a block diagram of the calendar system, including search region and search logic, according to the teachings of the present invention.

FIG. 5 shows a block diagram of the calendar system according to the teachings of the present invention. The calendar system includes calendar 48 and search logic 50. The calendar 48 defines a search zone usually a portion of memory which includes a plurality of locations. For example, in FIG. 5 search zone has 512 locations 0–511 ($2^9$) search locations. Each search location has a number, a status bit (S) and an associated space in which information such as Flow Queue id can be written and stored. When the scheduler attaches a flow queue to the calendar the id of the queue is written in the space at one of these locations. The status indicator is a bit which can be set in one of two states (0, 1). In this implementation of the invention when S is set to 1 this means it's a valid location with an associated queue id stored in the space associated with the indicator. The management, such as writing/deleting etc., of the calendar is done by logic in the scheduler. This logic performs such functions as setting/resetting bits, writing information in the space, etc. The Search Logic 50 and algorithm provides a facility that searches the calendar to determine which queue id will be elected from which the next flow will be transmitted from the traffic flow queue to a target port.

Still referring to FIG. 5, all searches have two parts. A first part of the search begins at a search starting point (CP) to the last element in the search region. The second part of the search begins at the first element in the search region and ends at the last element before the CP whereat the search began. The part of the search beginning at the location 0 and ending at the location prior to the search start point is shown in FIG. 5 as the Last Part of Search. The search beginning at the CP and ending at the top is shown in FIG. 5 as First Part of Search. The search starting point for each search is identified by a pointer which is moved sequentially by the algorithm in the scheduler. The intent of searching the calendar is to detect the first location following the CP whereat the indicator set to 1. This location is referred to as the Winning Location and the queue id associated with that location is the queue from which data may be transferred. In order to describe the invention hereinafter the following terminologies will be followed. The calendar is an entity which includes a specified number of locations, each of which may contain a valid candidate. A candidate is valid if there are one or more traffic queues attached to that calendar location. A calendar search is conducted per a pre-defined search algorithm. The decision as to whether or not there is a winner for the calendar, along with the Winning Location (in the case that a winner is selected) is made per the algorithm set forth hereinafter.

Referring again to FIG. 5, because the searching begins from a starting point to the top of a segment wrapped around to the beginning of the calendar and progresses back to the location adjoining the point where the search began the calendar could be viewed as a circular entity. Each entry contains data which indicates whether or not a valid candidate is at this location. If a valid candidate is not found at the start location the next location in the 512 entry search sequence is checked for a valid entry (one in which the status bit is set to 1). The search continues sequentially through all 512 locations. The last search location is the location previous to the start location until either the first valid candidate (winner) is found or there are no valid candidates for entry on any of the 512 locations. When the first valid entry is encountered, the search must indicate that a Winner has been found, along with the corresponding winning location. For this type of search arrangement the search must be able to locate the winner using a start point at any location on the calendar and must be able to search through all 512 locations in a relatively short period of time which is usually set by the Quality of Service and other constraints of the system. Because of these constraints, the present invention provides the search routine which uses only two machine cycles to effectuate the search no matter where the valid entry is located within the 512 locations of the calendar.

Figure 6:
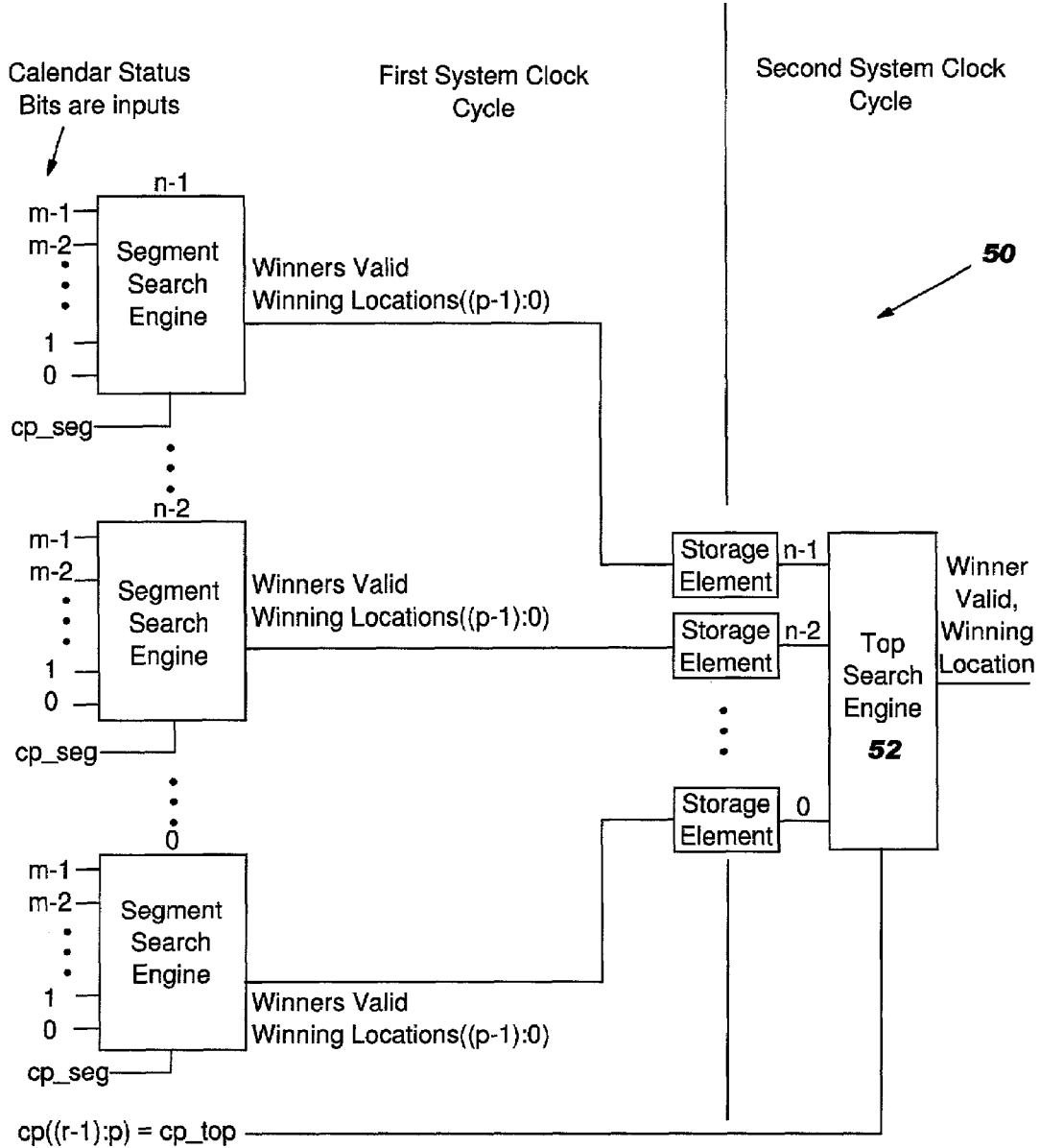
FIG. 6 shows a block diagram of the search logic.

FIG. 6 shows a block diagram of the search logic and algorithm 50. The search logic includes a plurality of segment search engines numbered 0 through n−1. The input into each of the segment search engines includes the starting point where the search begins and indicated in the figure as CP-SEG. The other inputs into each of the segment search engines includes the output from calendar status bits associated with the particular segment. Stated another way, the search zone is broken up into n segments (n greater than 0), and the number of locations is fed into that segment search engine. The output from each segment search engine is fed into storage elements and the output from the storage elements are fed into Top Search Engine 52. The output information from Top Search Engine 52, Winner Valid and the Winning Location are fed to the scheduler which moves the frame in the Flow Queue associated with that location into the Target Port Queue. As can be seen in FIG. 6 the information generated by each segment is a Winner Valid information and the Winning Location. As stated previously this location is the first one that has its status bit set to logical "1" (ON) after the CP. Stated another way it's the first location upstream from the CP that has its status bit activated. It should also be noted that two system clock cycles are required for the search of the 512 locations. The searching is done simultaneously rather than sequentially. By segmenting the search zone and executing the search simultaneously, the Winning Location (first location after CP with its bit set) can be detected in a very short period of time to meet specific Quality of Service requirements of the system.

Still referring to FIG. 6, the search region is partitioned into n different subregions, or segments, where n is greater than 0. The segments are searched simultaneously by a common searching routine. Each segment search contains m entries. The results of each segment search are captured by a storage element. The second search or Top Search is performed taking the outputs of each of the storage elements and generating the final result. For the segment searches the search starting point cp_seg is the same value for each of the segments. The value of cp_seg is the least significant bits of the binary representation of cp. The bit range of cp_seg is sufficient to represent all m entries in the segment. For example, if the calendar has 512 each segment contains 64 entries (m=64), then the number of bits necessary to represent cp_seg is equal to $\log_2 64=6$. The number of bits for the cp_top is equivalent to those necessary to represent the number of segments. For example, if there are 8 segments, then the number of bits for the top cp would be $\log_2 8=3$. Concatenating cp_top with the cp_seg would yield the complete value of cp. For example, if the entire calendar range was 512 values, this could be represented with 9 bits. If the desired number of segments were 8, this means that there are 512/8, or 64 calendar entries per segment. For example, if the value of cp were decimal 314, the binary value of 314 would be "1 0011 1010". Because there are 8 segments, the value of cp_top would be the three most significant bits of the binary value of 314, or "100" binary. The three most significant bits are used because three bits are necessary to represent 8 segments. The value of cp_seg would be equal to the 6 least significant bits of decimal 314, or a binary value of "11 1010".

Still referring to FIG. 6 the n segment outputs are fed to the Top Search Engine 52. The Top Search Engine 52 begins searching from the segment indicated by the most significant bit of the binary representation of CP identified as CP-Top. The range of CP-Top is sufficient to represent all n segments of the entire calendar. The Top Search Engine will use the data provided by the segment containing CP, along with the data provided by the other segments to conduct the search until it finds a Winning Location if there is one. The overall Winning Location is a concatenation of the segment containing the winner (most significant bits of the overall winner), along with the winning location within the segment (least significant bits of the overall winner). Using the example where there are 512 calendar locations, broken into eight 64-location segments, a top search winning value of binary "010" indicates that the segment search output for segment "010" must be use to determine the final winning location. If the winning location for segment "010" was a value of binary "111011", then the winning location would be represented in 9-bit binary as "010111011", corresponding to 221 decimal.

Figure 7:
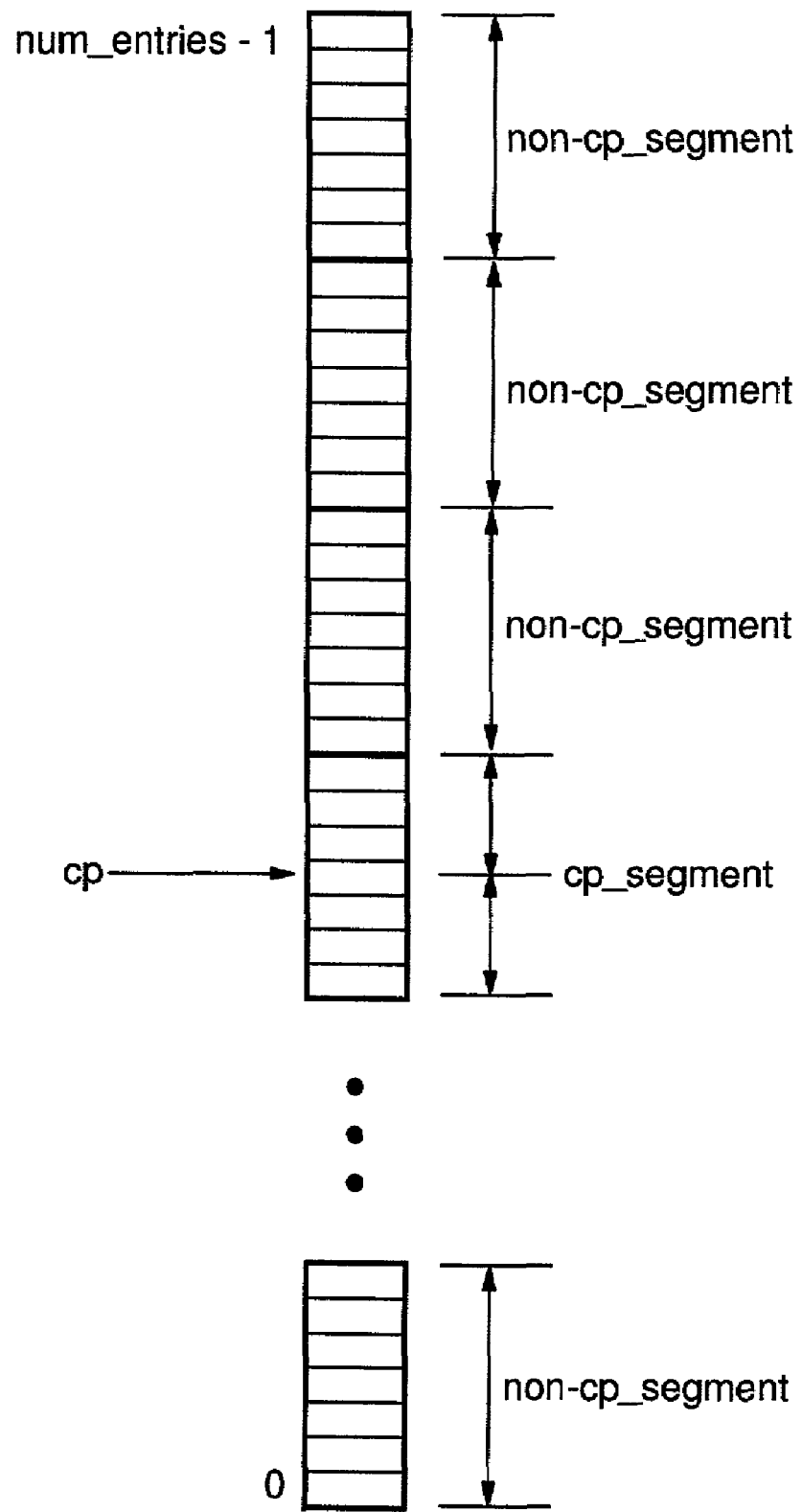
FIG. 7 shows graphical representation of the general case for searching segments containing starting point (CP) and segments not containing a Starting Point (CP).

All bits of the starting point (CP) representation are not passed onto the segment search. Therefore, there is insufficient data to determine whether or not this segment truly contains CP. Because of this uncertainty, assumptions have to be made in order to determine the true starting point. The assumptions are: 1) the CP is in the segment and 2) the CP is not in the segment. Turning to FIG. 7 for the moment a graphical representation of the general case of searching segments containing starting point (CP) and segments not containing a starting point (CP) is shown. As is evident from the it figure, the non-CP segment searching begins at the bottom of the segment and ends at the top of the segment, whereas in the CP segment searching begins at the CP to the top and then from the bottom of the segment to the location immediately adjoining to the location of the CP. More particularly, and with reference to FIG. 7, for the assumption that the segment does not contain CP, the search begins at the bottom of the segment and continues upward in the segment until either a winner (i.e. first location from starting point where a bit is set to a logical 1) is found or the top (last) entry of the segment is reached. For the assumption that the segment contains CP, there are two individual searches. The first CP segment search begins at the bottom of the segment and continues upwardly in the segment until either a winner is found or the entry before the CP-segment is reached. The second CP-segment search begins at the entry corresponding to CP-segment and continues upwardly in the segment until either a winner is found or the top entry of the segment is reached. For each of these three searches there must be an indication that a winner has been found, and a winning location that is qualified by an indication. As a consequence, it should be noted that the output from each segment includes three pieces of information associated with what was found in each of the searches.

Figure 8A:
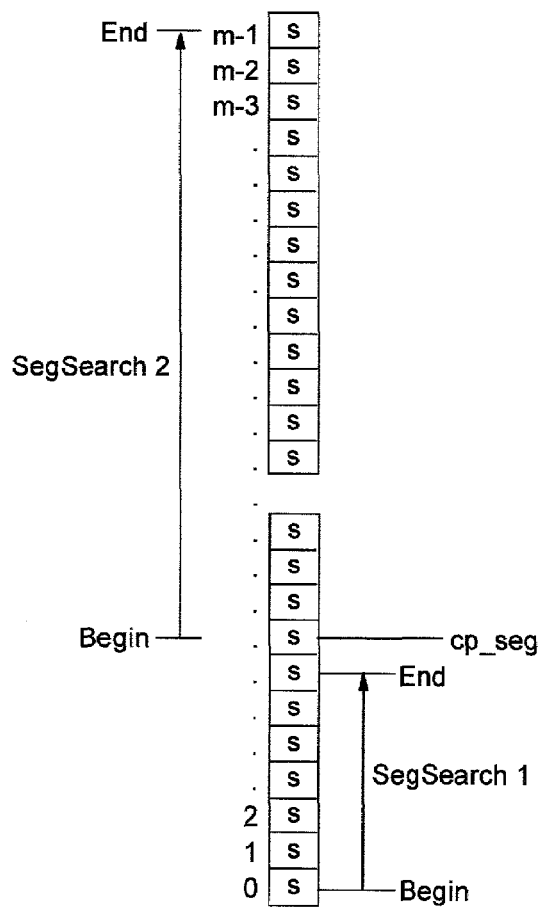
FIG. 8, consisting of FIGS. 8a and 8b, shows a graphical representation of searching segments based upon assumptions that a search starting point (CP) is in the segment and the search starting point (CP) is not in the segment.
Figure 8B:
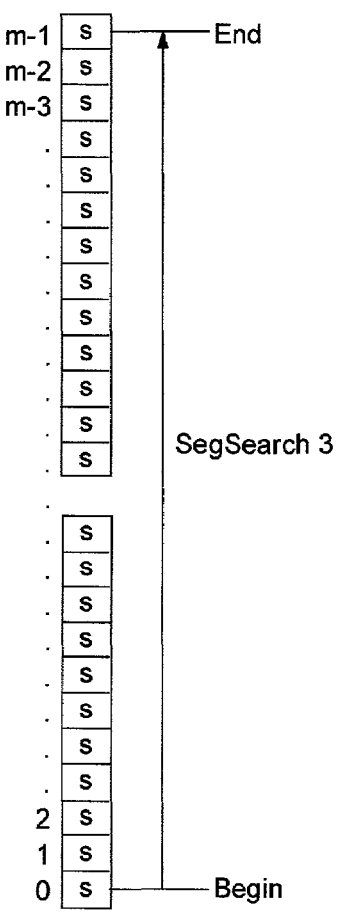

FIGS. 8a and 8b show more detailed graphical representation of the starting and end points of these three segment searches. As stated above, three different search routines are required for searching each segment. With this in mind, the searches are labeled in FIGS. 8a and 8b as SegSearch 1, SegSearch 2 and SegSearch 3. It should be noted that the numbering merely identifies the search that must be done, but does not imply that they should be done sequentially, i.e. SegSearch 1, then SegSearch 2, then SegSearch 3. The searching may be done in any order. The guiding factor is the assumptions that are being made. In FIG. 8a it is assumed that the starting point (CP) is in the segment, hence the starting point is labeled CP-segment. One of the searches in the segment begins at the CP and ends at the top of the segment. This search is labeled SegSearch 2. In SegSearch 1 the search begins at the first location in the segment and ends at the location next to the CP where the SegSearch2 began. The begin and end of each of the segment searches are identified by begin and end, respectively.

In FIG. 8b it is assumed that the CP is not in the segment. With this assumption, the search begins at the first location 0 of the segment and ends at the last location. There is no wrap-around for this assumption.

Figure 9:
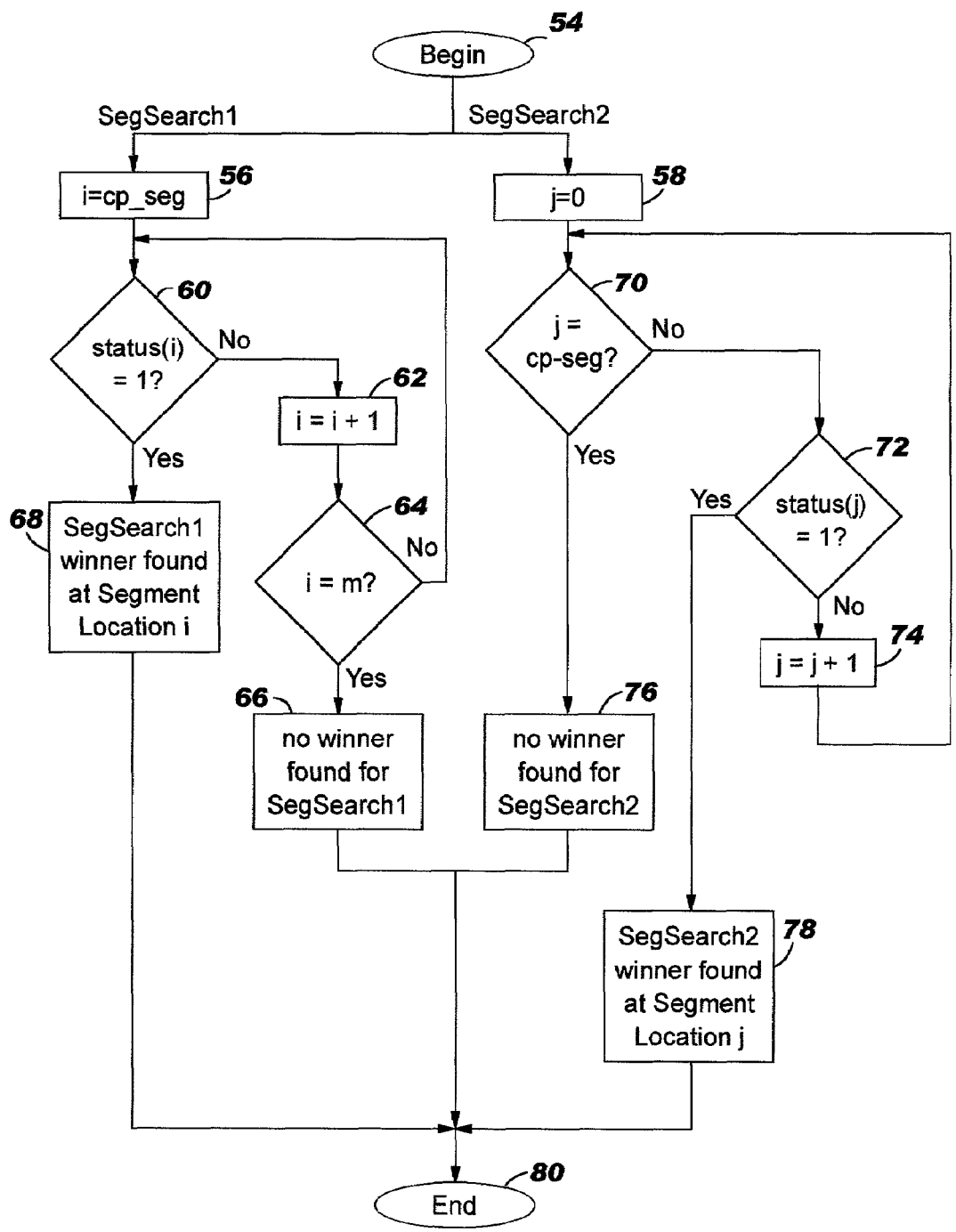
FIG. 9 is a flowchart of segment search 1 and segment search 2, indicating the starting point (CP) is in the segment. This flow chart can be used to generate the hardware logic circuit.

FIG. 9 shows a flowchart for SegSearch 1 and SegSearch 2 searches. This search diagram or flow chart can be used by one skilled in the art to generate the logic for this portion of the search that goes into search logic and algorithm 50, FIG. 5. Still referring to FIG. 9, the search begins in the block labeled 54 and ends in the block labeled 80. In particular, the algorithm begins in block 54 and goes into block 56 for SegSearch 1. Beginning with SegSearch1, a counter used to represent the locations in the segment (i) is initialized to the value of cp for that segment, or cp_seg in block 56. Block 60 is the decision block which checks for a Status value of 1 for the segment location corresponding to i. If the answer to block 60 is yes, then a SegSearch1 winner has been found at segment location i, as indicated by block 68, and SegSearch1 is complete. If the answer to block 60 is no, then i is incremented by a value of one in block 62, and this incremented value is compared to m, which is the highest (topmost) calendar entry for the segment in block 64. If the answer to block 64 is yes, then SegSearch1 is complete, with no winner found, as shown in block 66. If the answer to block 64 is no, then the decision block 60 checks the status value for the new calendar location. This repeating sequence of testing the calendar status bit in block 60 is repeated until either a winner is found (the answer for decision block 60 is yes) or the top of the segment is reached without a winner (the answer for decision block 64 is yes).

Continuing with SegSearch2, a counter used to represent the locations in the segment (j) is initialized to a value of zero, which is the lowest (bottommost) calendar entry of the segment in block 58. Block 70 is the decision block which compares the value of j to cp_seg, or the highest (topmost) calendar entry of the segment. If the answer to block 70 is yes, then there is no winner found for SegSearch2, as indicated in block 76, and SegSearch2 is complete. If the answer to block 70 is no, then decision block 72 is entered. Block 72 checks for a Status value of 1 for the segment location corresponding to j. If the answer to block 72 is yes, then a SegSearch2 winner has been found at segment location j, as indicated in block 78, and SegSearch2 is complete. If the answer to block 72 is no, then the counter j is incremented by one to point to the next highest calendar location, as shown in block 74, and decision block 70 is reentered. The repeating sequence of comparing the value of j to the topmost segment location (decision block 70), followed by testing the calendar status bit in block 72 is repeated until either (1) the answer to block 70 is no, indicating that no winner is found for the segment, or (2) the answer to block 72 is yes, indicating that a winner has been found at location j.

Figure 10:
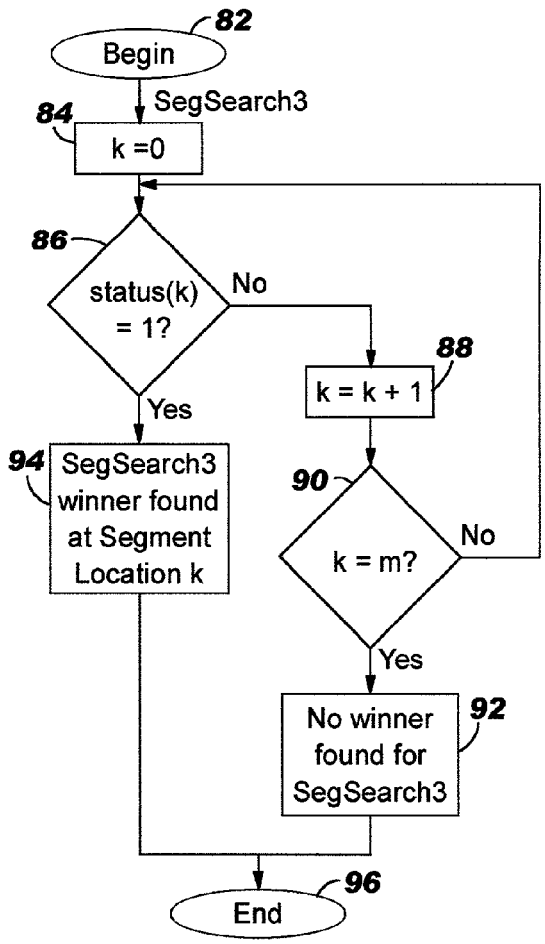
FIG. 10 is a flowchart of segment search 3, including assumption that starting point (CP) is not in segment.

FIG. 10 shows a flow diagram for the algorithm that is used to execute SegSearch 3. He flow diagram can be used by someone skilled in the art to generate the logic that goes into block 50 (FIG. 5). The search begins in block 82 and ends in block 96. In particular, the algorithm for SegSearch 3 begins in block 82. SegSearch3 begins by initializing a counter used to represent the locations in the segment (k) is initialized to a value of zero, which is the lowest (bottommost) calendar entry of the segment in block 84. Block 86 is the decision block which checks for a Status value of 1 for the segment location corresponding to k. If the answer to block 88 is yes, then a SegSearch3, then a Segsearch 3 winner has been found at segment location k, as indicated in block 94, and SegSearch3 is complete. If the answer to block 86 is no, then k is incremented by a value of one, as shown in block 88, and decision block 90 is entered. Decision block 90 compares the value of k to m, which is the highest (topmost) calendar entry of the segment. If the answer to block 90 is yes, then no winner for SegSearch3 has been found, as shown in block 92, and SegSearch3 is over. If the answer to block 90 is no, then decision block 86 is reentered. The repeating sequence of checking the calendar status bit (decision block 86), followed by comparing the value of k to the topmost segment location (decision block 90) is repeated until either (1) the answer to block 86 is yes, indicating that a winner has been found at location k, or (2) the answer to block 90 is yes, indicating that there is no winner found for the segment.

Figure 11:
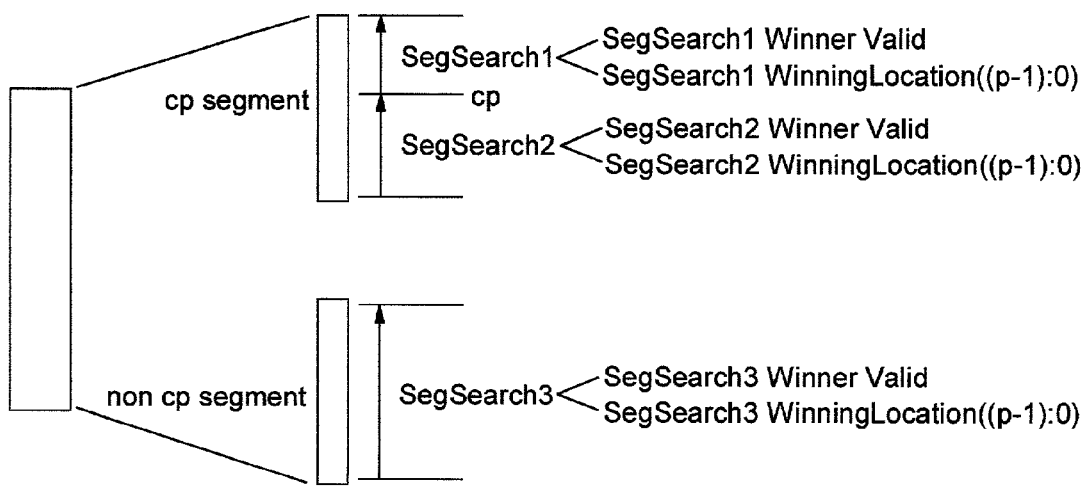
FIG. 11 is a graphical representation of information contained in outputs from the segment search engines.

FIG. 11 is a graphical representation of the outputs from a segment. As stated above, two assumptions are made. In one assumption, it is assumed the CP is in that segment. The segment is labeled cp segment and the output is two searches, labeled SegSearch1 and SegSearch2. The information output and the result of these two is searches are SegSearch1 Winner Valid and SegSearch1 Winning Location. In the other assumption, the CP is not in the segment. The output for that segment is labeled non cp segment. A single output labeled SegSearch3 provides SegSearch3 Winner Valid and SegSearch3 Winning Location information.

Figure 12:
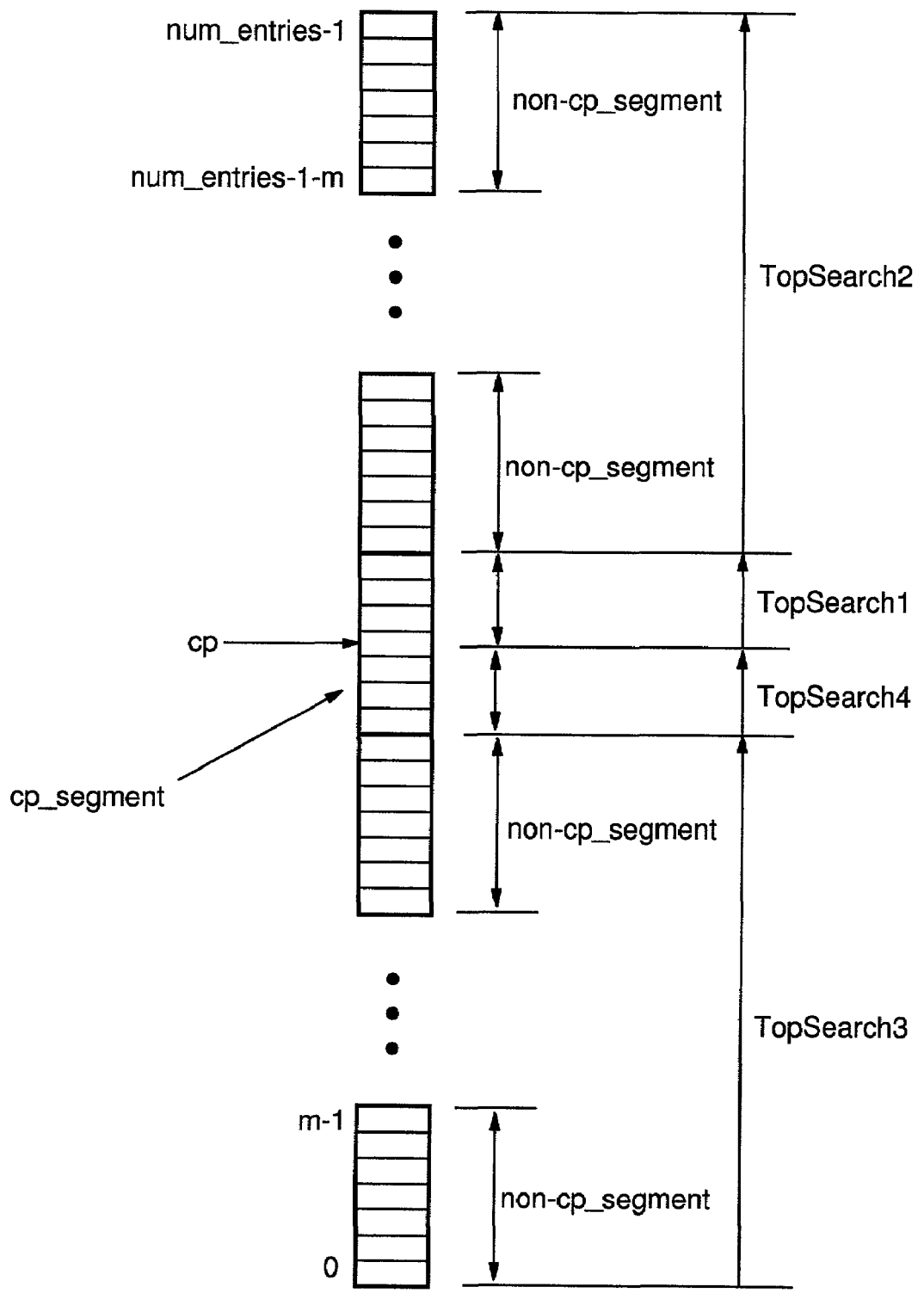
FIG. 12 is a graphical representation of the Top Search Engine processing the information received from the segment search engines.

FIG. 12 shows a graphical representation of the top search region. As stated above, the information generated in the segments are provided to the top search engine. The top search, having the CP segment value as an input, begins in the segment that contains CP, labeled in the Figure cp_segment. During TopSearch1, the top search algorithm considers the SegSearch1 results for the segment containing CP. If a winner is found for this search then this segment location forms a least significant bit(s) of the winner, the segment containing cp (cp_top) forms the most significant bit(s) of the winner and the overall search is complete.

If no TopSearch1 winner is found, TopSearch2 is conducted. During TopSearch2, the Top Search algorithm considers the SegSearch3 results for the segments, beginning with the segment above cp and continues upward through the segments until either a winning segment is found or the top segment is reached. If a winner is found then the segment containing the winner forms the most significant bits of the winner. The SegSearch3 winning location forms the least significant bits of the winner and the overall search is complete.

If no TopSearch2 winner is found, the TopSearch3 is conducted. During TopSearch3, the TopSearch3 algorithm considers the SegSearch3 result for the segments, beginning with the bottom segment, and continuing upward until either winning segment is found or the segment before cp_top is reached. If a segment winner is found, then the segment containing the winner forms the most significant bits of the overall winner, the SegSearch3 winning location forms the least significant bits of the winner, and the overall search is complete.

If no TopSearch3 winner is found, TopSearch4 is conducted. During 20 TopSearch4, the Top Search algorithm considers the SegSearch2 results for segment cp_top. If a winner was found for the segment, then this segment location forms the least significant bits of the overall winner. The segment containing cp (cp_top) forms the most significant bits of the overall winner and the overall search is complete. If no TopSearch4 winner is found then the overall search is complete with no winner found.

Figure 13:
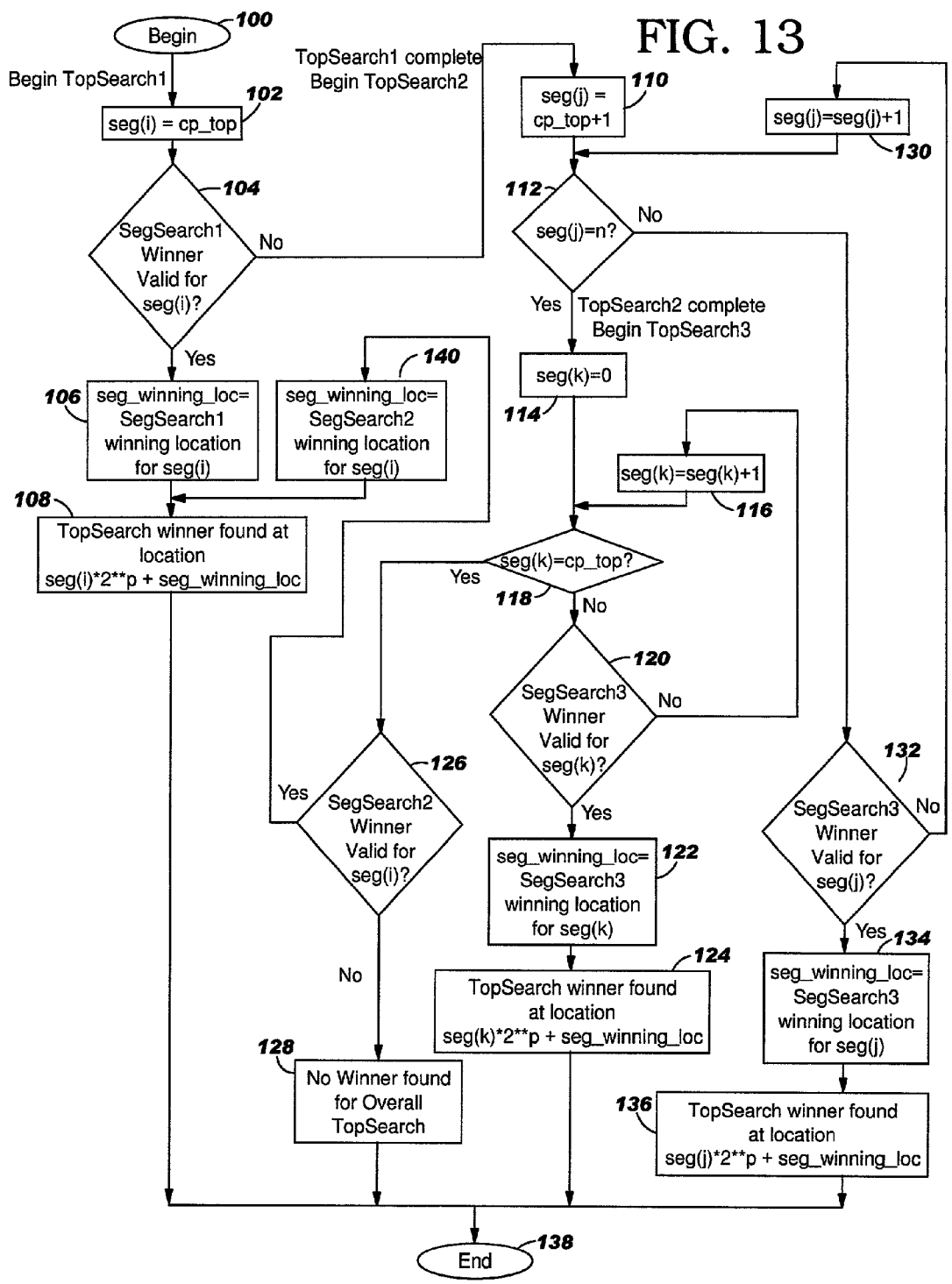
FIG. 13 is a flowchart of the logic for the Top Search Engine. This flow chart can be used to generate the hardware logic circuit.

FIG. 13 shows a flowchart of the algorithm for generating the Top Search. This algorithm can be used by one skilled in the art to build the logic that goes into Top Search Engine and the search logic 50 to do the Top Search. The algorithm begins in block 100 and ends in block 138. In particular, in block 100 the algorithm begins and descends into block 102. A variable (seg(i)) is initialized to the largest (topmost) segment value, as shown in block 102. Decision block 104, which checks for a SegSearch1 winner is entered. If the answer to block 104 is yes, then a winner has It, been found, and the search is complete. The segment winning location is the SegSearch1 winning location for segment seg(i), which forms the least significant bits of the winner, as indicated in block 106, and the winning segment is seg(i), which forms the most significant bits of the winner. The formula for the winning location in decimal is given in block 108. If the answer to block 104 is no, then block 110, which sets the value of another variable (seg(j)) to the value of one greater than the highest (topmost) segment. Decision block 112, which checks to see if we have incremented beyond the topmost segment is then entered. If the answer to decision block 112 is no, then we enter decision block 132, which checks for a SegSearch3 winner for segment seg(j). If the answer to block 132 is yes, then a winner has been found, and the search is complete. The segment winning location is the SegSearch3 winning location for segment seg(j), which forms the least significant bits of the winner, as indicated in block 134, and the winning segment is sego), which forms the most significant bits of the winner. Block 136 shows the formula for the winning location (decimal value). If the answer to block 132 is no, then block 130, which increments seg(j), is entered. Decision block 112 is then reentered.

If the answer for decision block 112 is yes, then we have gone beyond the top segment, and block 114 is entered, which sets a variable (seg(k)) to zero, indicating the lowest (bottommost) segment. Decision block 118, which checks to see if seg(k) is equal to cp_top, or the topmost segment, is entered. If the answer to decision block 118 is no, then decision block 120 is entered. Decision block 120 checks for a SegSearch3 winner for seg(k). If the answer to decision block 120 is yes, then a winner has been found, and the search is complete. The segment winning location is the Segsearch3 winning location for segment seg(k), which forms the least significant bits of the winner, as indicated in block 122. The winning segment is seg(k), which forms the most significant bits of the winner. Block 122 shows a formula for the winning location (decimal value). If the answer to block 120 is no, then block 116, which increments the segment counter (seg(k)) is entered. Decision block 118 is then reentered. The sequence of entering block 118 is repeated through block 116 is repeated until the answer to block 118 is yes. An answer of yes for block 118 indicates that the topmost segment has been reached. Decision block 126, which checks for a SegSearch2 winner for seg(i) (the top segment), is then entered. If the answer for block 126 is no, then the search is complete, with no winner found, as indicated in block 128. If the answer to block 126 is yes, then a winner has been found, and the search is complete. The segment winning location is the SegSearch2 winning location for segment seg(i), which forms the least significant bits of the winner, as indicated in block 140, and the winning segment is seg(i), which forms the most significant bits of the winner. The formula for the winning location in decimal is given in block 108.

Even though illustrative embodiments of the present invention have been described herein with references to the accompanying drawings, it is to be understood that the invention is not limited to those precise embodiments and that various other changes and modifications may be affected therein by one skilled in the art without departing from the scope or spirit of the invention.

What is claimed is:

1. A method to select a queue from which a packet is to be transmitted within a communications device said method including:

providing at least one calendar with n locations, n greater than 1, wherein each location includes id for a queue and an indicia to be set in one of two states;

partitioning the n locations into a plurality of segments;

searching each segment with a search engine to detect a first location having an associated indicia set to a predefined state;

for each segment search, setting assumptions for a starting point CP whereat said searching begins wherein said assumptions cause multiple searches to be executed on at least one of said plurality of segment and the assumptions include no current pointer CP is within a segment being searched wherein searching begins at a first location of the segment and ends at the last location of said segment and a current pointer CP is in the segment being searched wherein searching begins at current pointer location in said segment being searched ending at the last location of said segment and searching begins at the first location of the segment ending at a location preceding the current pointer location;

using outputs from the search engine to select one of the locations; and transferring a packet from the queue whose id is recorded at the one of the location.

* * * * *